No. 857,997. PATENTED JUNE 25, 1907.
F. W. HALL.
MOLDING MACHINE.
APPLICATION FILED APR. 24, 1906.

8 SHEETS—SHEET 1.

WITNESSES:

INVENTOR
Frederick W. Hall
BY
ATTORNEY.

No. 857,997. PATENTED JUNE 25, 1907.
F. W. HALL.
MOLDING MACHINE.
APPLICATION FILED APR. 24, 1906.

8 SHEETS—SHEET 2.

Fig. 2.

WITNESSES:
A. M. Biddle.
W. S. Babcock.

INVENTOR
Frederick W. Hall
BY
H. H. Henton
ATTORNEY.

No. 857,997. PATENTED JUNE 25, 1907.
F. W. HALL.
MOLDING MACHINE.
APPLICATION FILED APR. 24, 1906.
8 SHEETS—SHEET 3.
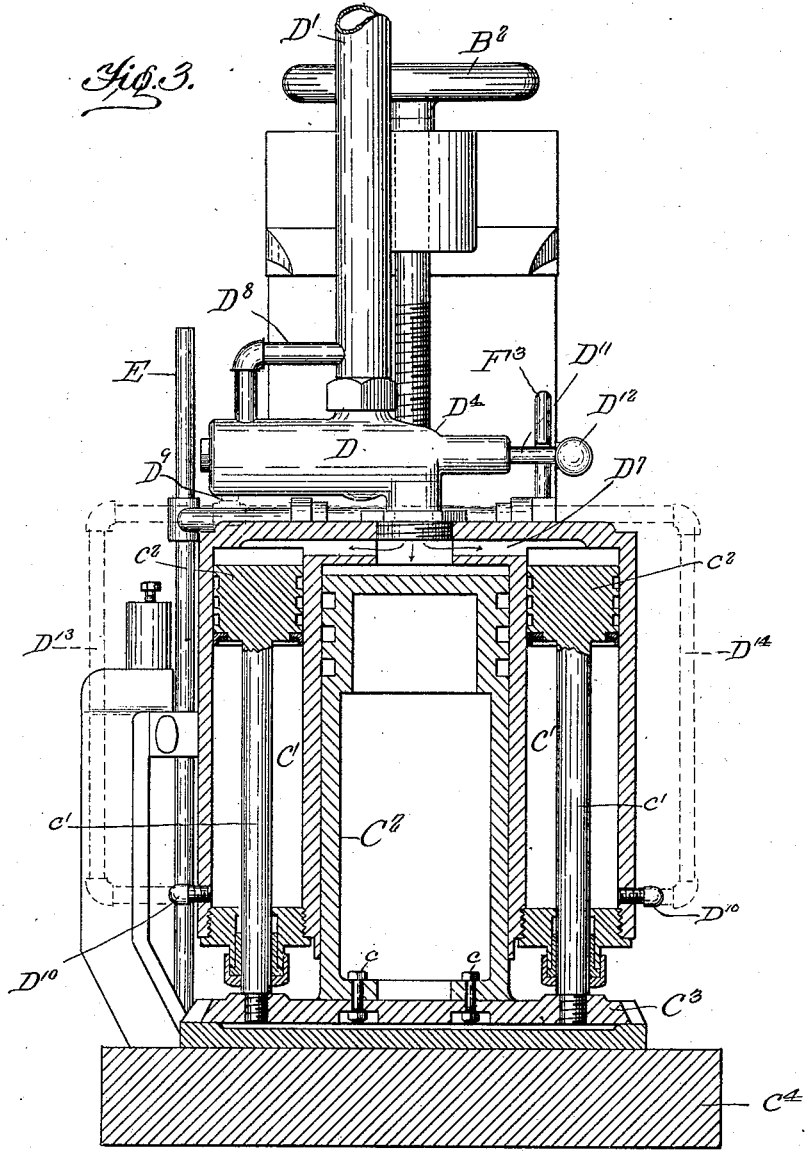
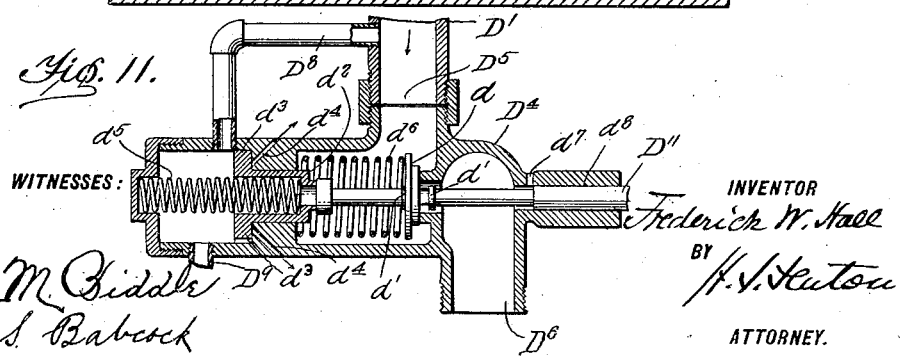
WITNESSES:
A. M. Biddle
W. S. Babcock
INVENTOR
Frederick W. Hall
BY
H. J. Heaton
ATTORNEY.

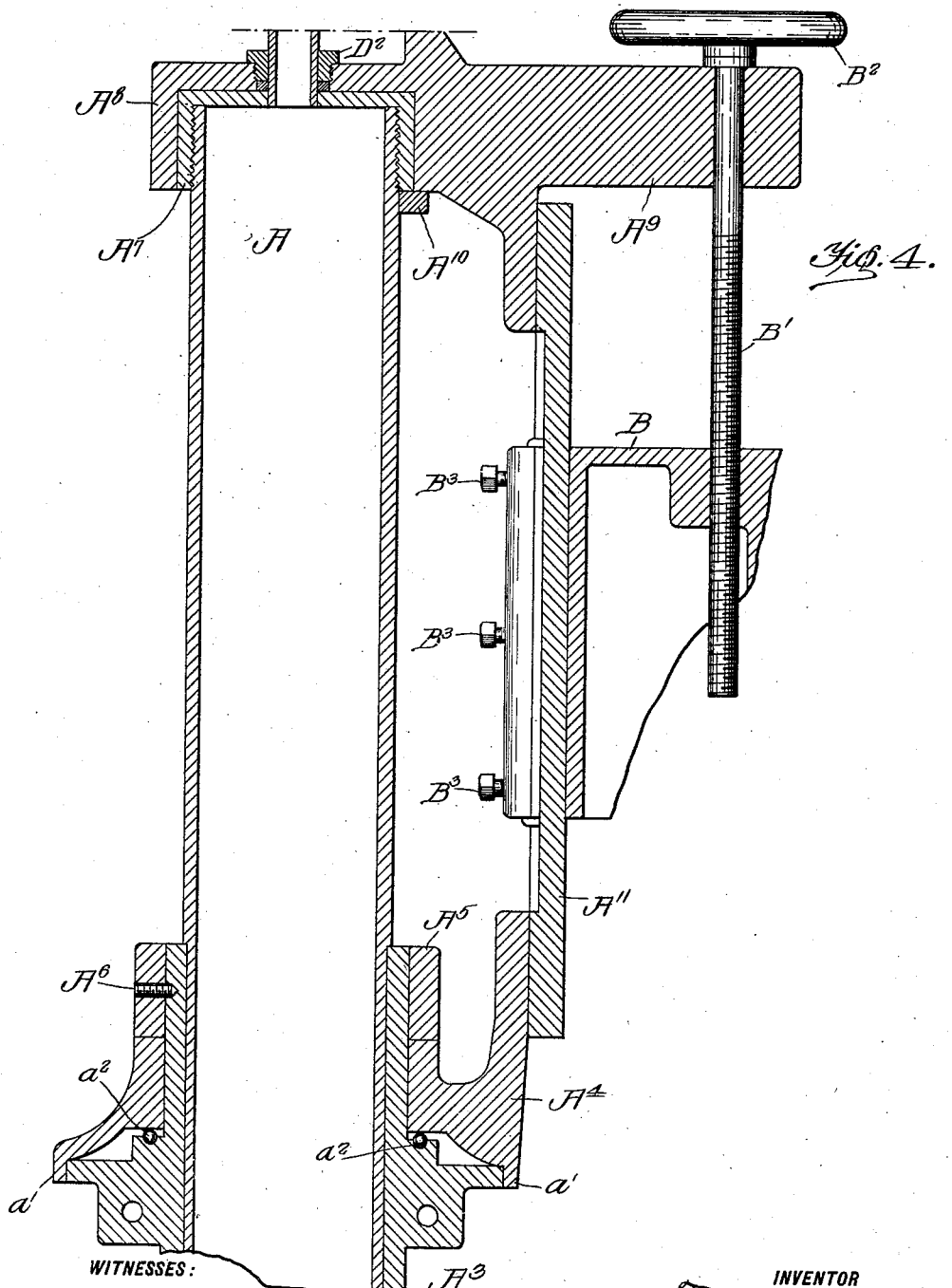

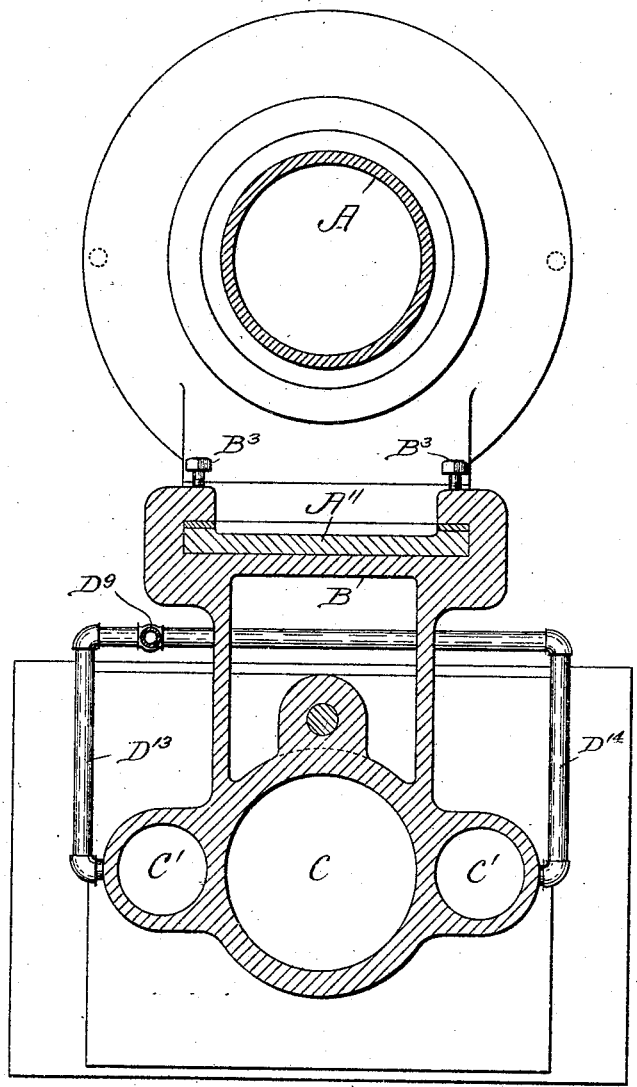

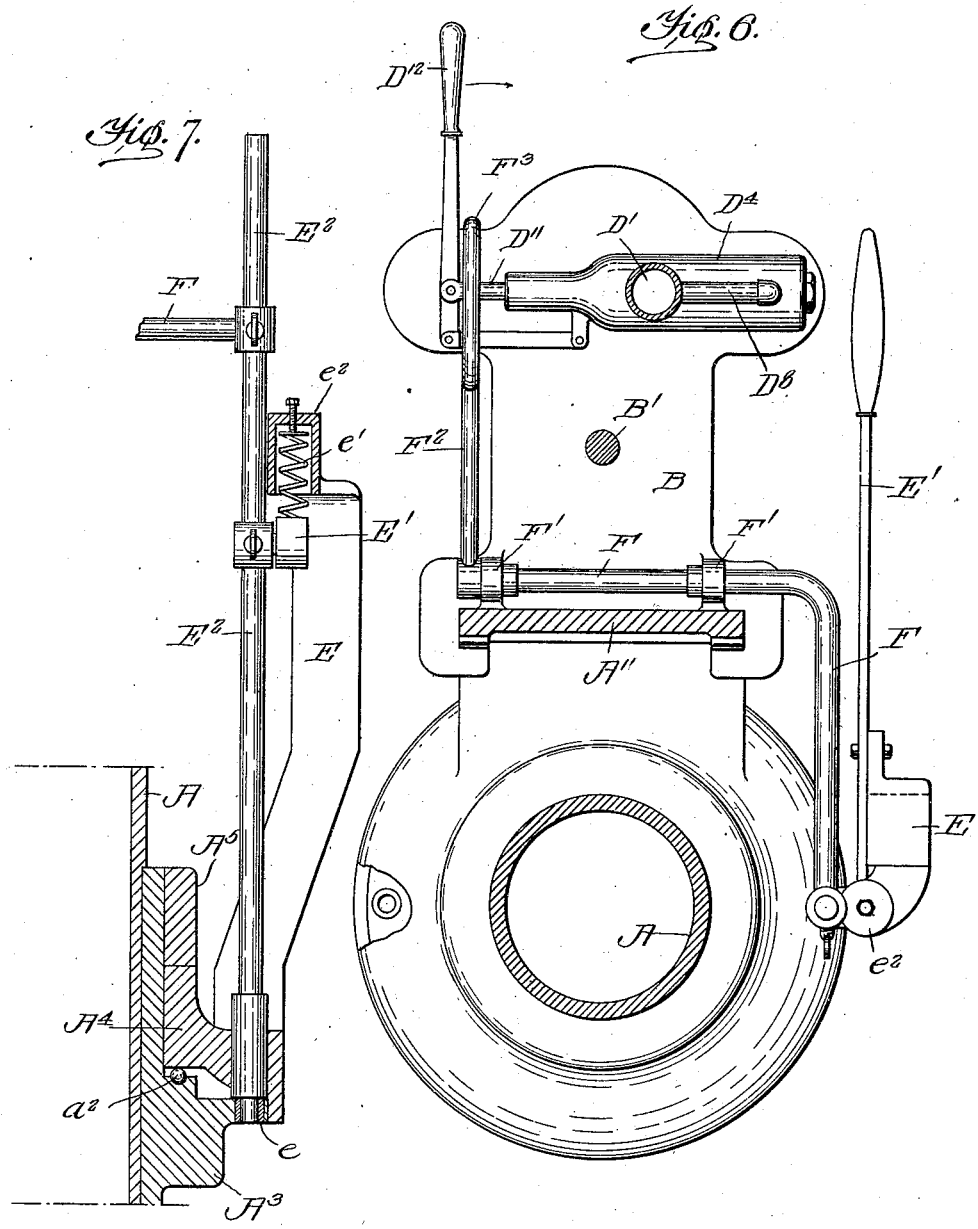

No. 857,997. PATENTED JUNE 25, 1907.
F. W. HALL.
MOLDING MACHINE.
APPLICATION FILED APR. 24, 1906.
8 SHEETS—SHEET 7.

WITNESSES:
A. M. Biddle
W. S. Babcock

INVENTOR
Frederick W. Hall
BY
H. J. Hinton
ATTORNEY.

No. 857,997. PATENTED JUNE 25, 1907.
F. W. HALL.
MOLDING MACHINE.
APPLICATION FILED APR. 24, 1906.
8 SHEETS—SHEET 8.
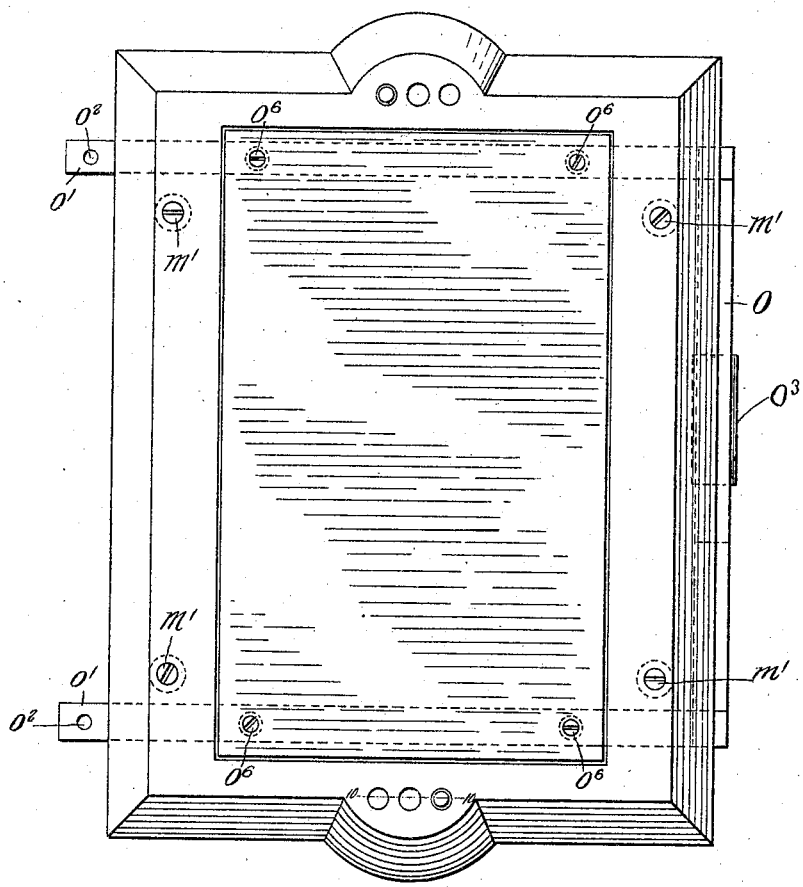
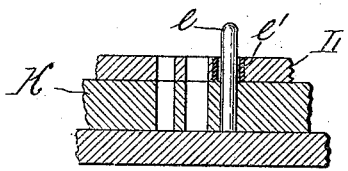
WITNESSES:
INVENTOR
Frederick W. Hall
BY
ATTORNEY.

UNITED STATES PATENT OFFICE.

FREDERICK W. HALL, OF CAMDEN, NEW JERSEY, ASSIGNOR OF ONE-HALF TO HOWARD M. BOUGHER AND ONE-HALF TO J. W. PAXSON COMPANY, BOTH OF PHILADELPHIA, PENNSYLVANIA, A CORPORATION OF PENNSYLVANIA.

MOLDING-MACHINE.

No. 857,997.  Specification of Letters Patent.  Patented June 25, 1907.

Application filed April 24, 1906. Serial No. 313,399.

*To all whom it may concern:*

Be it known that I, FREDERICK W. HALL, a citizen of the United States, residing at Camden, in the State of New Jersey, have invented certain new and useful Improvements in Molding-Machines, of which the following is a full, clear, and exact description, reference being had to the accompanying drawings, forming a part of this specification.

The invention to be hereinafter described relates generally to molding machines and, more particularly, to that class of such machines wherein the sand is rammed in the flask and about the patterns by power operated ramming devices.

In a former patent granted to me, No. 775,530, dated November 22, 1904, I described and claimed a machine of the above general type, wherein power operated ramming mechanism was mounted and combined in a particular manner with stripping mechanism operating to readily detach the patterns from the molded sand after ramming, and wherein means were provided for making molds in flasks of varying sizes, and means to facilitate the ready replacement and removal of the flask.

My present invention is designed as carrying forward the developments contained in my prior patent, the object being to provide means for giving a wider range of operative effect to the machine and to simplify various parts and their operative relation to each other.

With these generally stated objects in view, the present invention consists of the parts and combinations that will be hereinafter more fully described and then definitely pointed out in the claims.

Figure 1:
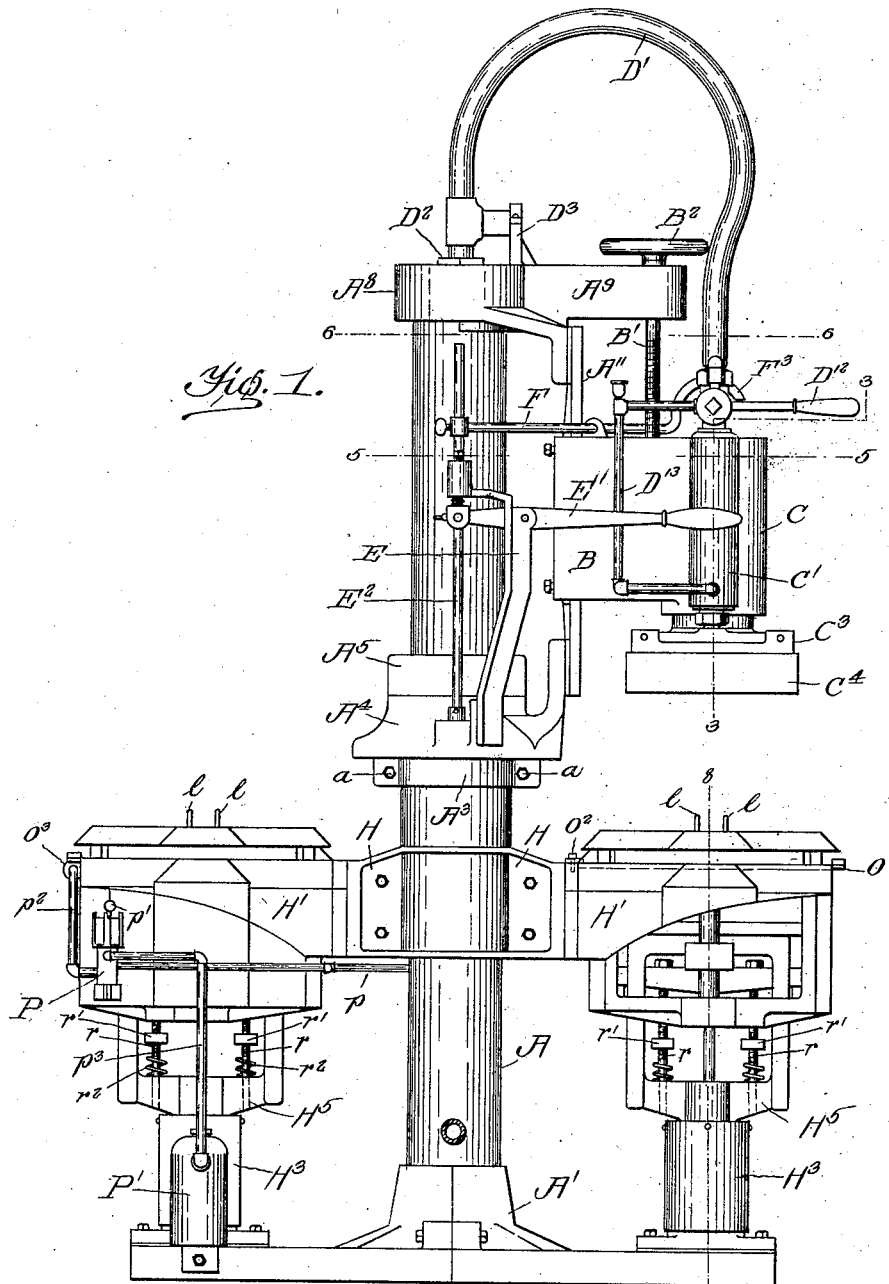
Figure 8:
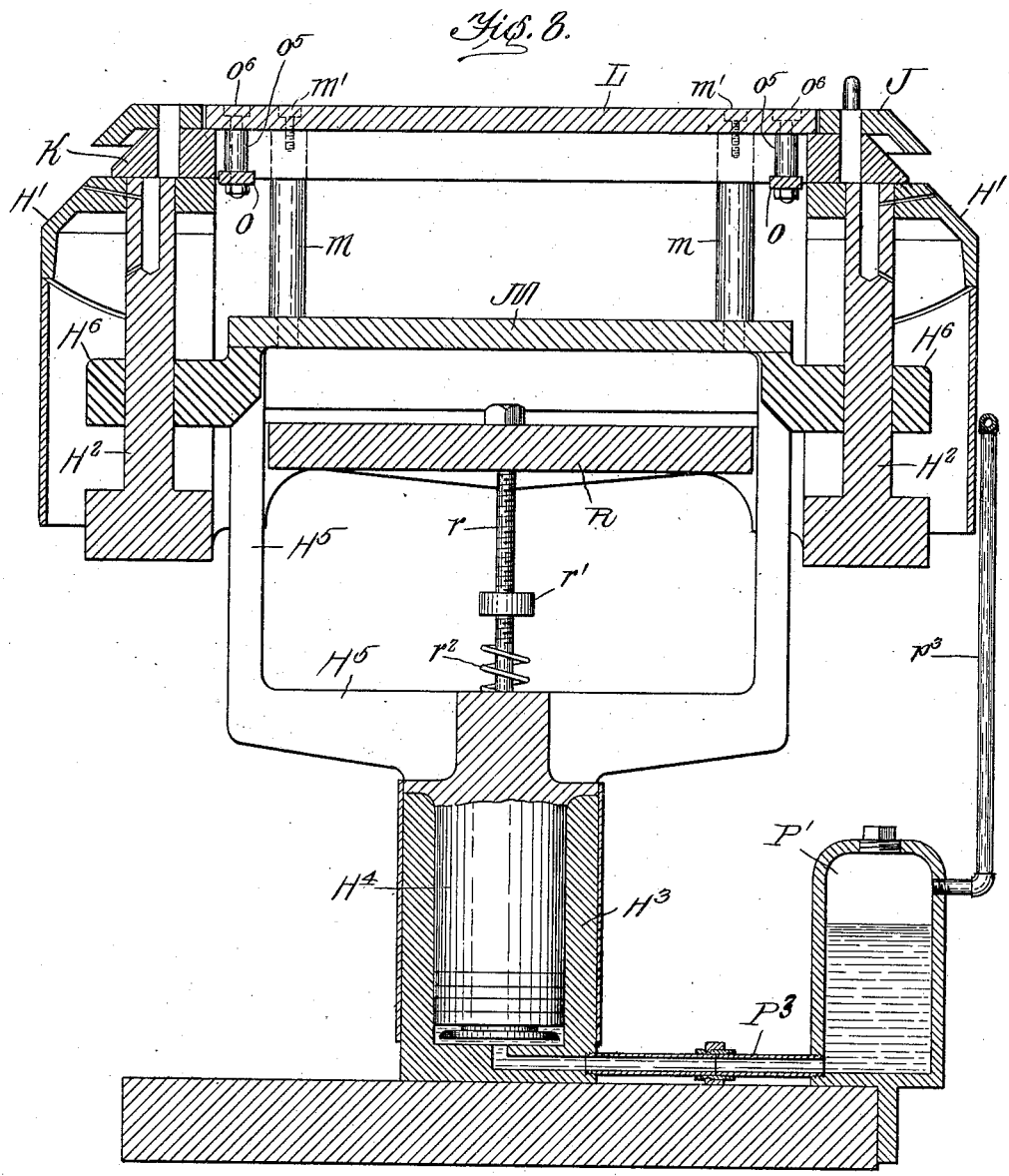

In the drawings forming part of this specification, in which like letters of reference apply to like parts in the several views, Figure 1 is a side elevation of a molding machine embodying the features of the present invention. Fig. 2 is an end elevation of the parts shown in Fig. 1, looking from the right of said Fig. 1. Fig. 3 is an enlarged sectional view through the triplicate cylinder and piston arrangement for the ramming devices, the section being taken on line 3—3 of Fig. 1. Fig. 4 is an enlarged sectional detail of a part of the main column and the adjusting means for raising and lowering the ramming devices and swinging them about said column. Fig. 5 is a horizontal section on line 5—5, of Fig. 1. Fig. 6 is a horizontal sectional view on line 6—6 of Fig. 1. Fig. 7 is a side elevation, partly in section, of the locking mechanism to be described. Fig. 8 is an enlarged sectional elevation on the line 8—8, Fig. 1. Fig. 9 is a plan view of one of the flask frames and a pattern plate with its vibrating devices associated therewith. Fig. 10 is a detached sectional detail through the pins of the flask frame on line 10—10 of Fig. 9. Fig. 11 is a sectional detail of the main or throttle valve.

Referring to the above drawings, the main support for the working parts of the entire apparatus consists of a hollow, upright column A, suitably supported on a base A', said column operating also as a storage receptacle for compressed air or other fluid, said air or fluid being introduced through a basal inlet, as $A^2$, Fig. 2, from a suitable fluid supply.

Secured to the hollow, upright column A by means of suitable fastenings $a$ is a fixed supporting sleeve $A^3$, on which is rotatively mounted a supporting bracket $A^4$, see Figs. 1 and 4, said bracket being held to the fixed sleeve $A^3$ by means of a collar $A^5$, disposed above the same and secured in place by a set screw $A^6$, see Fig. 4. The rotatable sleeve $A^4$ may preferably be provided with a downward extending portion, $a'$, to embrace a circular flange on the fixed sleeve $A^3$, roller bearings $a^2$ being preferably provided between the sleeve $A^3$ and rotatable sleeve $A^4$.

Disposed over the top of the hollow, upright column A is a cap piece $A^7$, see Fig. 4, and, embracing such cap is the upper bracket $A^8$, said bracket being provided with a side extension $A^9$ and with a locking lip $A^{10}$, the latter, Fig. 4, engaging beneath the edge of the cap $A^7$ and preventing upward displacement of the upper bracket $A^8$. Uniting the upper bracket $A^8$ and the lower bracket $A^3$ is a slide plate $A^{11}$ on which is slidingly mounted the supporting arm or bracket B carrying the power operated ramming devices to be hereinafter described.

It has been found, in practice, desirable to adjustably raise and lower the ramming devices of the machine of the present type, according to the character or conditions surrounding the work to be done, and in the present instance this adjustment is provided by means of a screw rod $B'$ having a threaded connection with the bracket B, Fig. 4, the unthreaded upper portion of such rod passing through the extension $A^9$ of the upper bracket and being provided with a hand wheel $B^2$. When the bracket B has been properly moved to its adjusted position it may be held there by suitable set-screws, as $B^3$.

Mounted on the bracket B are the cylinders and their adjunctive devices for operating the ramming instrumentalities. In the present form of the invention, the bracket B carries a main and two auxiliary cylinders, C and C', respectively, Fig. 5, the main cylinder C being preferably open at its lower end and provided with a plunger piston $C^2$, Fig. 3, connected by suitable bolts $c$ to the rammer head $C^3$ carrying the rammer board $C^4$. The two auxiliary cylinders, C' and C', have closed lower ends, through which extend the auxiliary piston rods $c'$ $c'$ carrying pistons $c^2$ $c^2$ at their upper ends, said piston rods being extended through suitable packing glands and secured to the rammer head $C^3$.

In order to control the operative condition of the main and auxiliary cylinders, there is provided adjacent thereto a suitable main or throttle valve D, best shown in Fig. 11, said main or throttle valve being connected by means of a pipe $D'$ to a gland $D^2$, Figs. 1 and 4, at the top of the hollow upright column A, a projection $D^3$ being secured to the upper bracket $A^8$ and connected to the pipe $D'$ to cause it to turn in its gland when the ramming devices are swung about the said upright column, see Fig. 1.

The main or throttle valve D, Fig. 11, comprises a suitable casing $D^4$, having an inlet $D^5$ directly connected to the pipe $D'$, and an outlet $D^6$ communicating with vent passages $D^7$, Fig. 3, communicating with the tops of the main and auxiliary cylinders. The valve casing has likewise connected to it a by pass pipe $D^8$ which is in communication also with the pipe $D^1$. An outlet, $D^9$, is provided at one end of the valve casing and is in communication with the lower ends of the auxiliary cylinders at $D^{10}$, Fig. 3. Passing through the valve casing is the valve stem $D^{11}$, to which is connected an operating handle $D^{12}$, Figs. 1 and 6, said valve stem carrying a valve disk $d$ disposed between the two collars $d'$ and $d'$ and having some lost motion between such collars. Directly connected to the end of the valve stem $D^{11}$ is the seating valve $d^2$ having peripheral portions $d^3$ which, when the seating valve is in the position indicated in Fig. 11, effectually closes the exhaust ports $d^4$ $d^4$ and leaves open the by pass pipe $D^8$, suitable springs $d^5$, $d^6$, being provided for normally holding the seating valve $d^2$ and the valve disk $d$ respectively in their closed position, as indicated in Fig. 11. The valve casing is likewise provided with an exhaust port $d^7$ which, when the valve stem is first moved to the left, Fig. 11, is closed by means of the enlarged portion $d^8$ of the valve stem. The pipe $D^9$, Fig. 11, is connected, as shown in Figs. 3 and 5 by means of pipes $D^{13}$, $D^{14}$, to the lower ends of the auxiliary cylinders, as at $D^{10}$.

The normal condition of the main or throttle valve D is that indicated in Fig. 11, at which time, it will be noted that air or fluid pressure may pass freely through the by pass pipe $D^8$ and the pipe $D^9$ to the lower ends of the auxiliary cylinders C' C', thereby holding the pistons of the cylinders, as well as the ramming head $C^3$ in their raised position, as indicated in Fig. 3. If it is desired to cause the ramming action to take place the handle $D^{12}$ of the main or throttle valve is moved in the direction of the arrow, or to the right, see Fig. 6, the effect of which is to first close the exhaust port $d^7$, open the exhaust ports $d^4$ $d^4$ and close the by pass pipe $D^8$ and, second, by means of the sleeve $d'$, to unseat the valve $d$, whereby air or fluid pressure will pass the valve $d$ through the opening $D^6$ into the passageways or vents $D^7$, connecting the upper ends of the main and auxiliary cylinders, thereby causing the air or fluid pressure to be exerted upon the tops of each one of these cylinders and exert the full effect of such pressure in the downward ramming action of the rammer head, the air in the lower parts of the auxiliary cylinders, at such time, being exhausted backward through the pipes $D^{13}$, $D^{14}$, into the valve casing $D^4$, and through the exhaust ports $d^4$. When the ramming action has been completed, the springs $d^5$, $d^6$ return the valve stem to the right, Fig. 11, thereby closing the exhaust ports $d^4$, opening the by pass pipe $D^8$, closing the valve $d$, and opening the exhaust port $d^7$, so that the air or fluid in the upper portions of the main and auxiliary cylinders may flow backward into the valve casing and exhaust through the port $d^7$. It will thus be seen that while the main and auxiliary pistons and their cylinders coöperate in the ramming action the auxiliary cylinders and pistons serve to return the rammer head back to its raised position, such returning movement being cushioned by the air or fluid exhaust through the port $d^7$. The ramming action having been performed in any case, it becomes desirable to swing the ramming devices about the column A into position over another flask or, if desired, simply swing it to one side out of the way while the ramming flask is removed. Obviously, however, it is desirable that the swinging action of the ramming devices may be prevented during the ramming action and for this purpose a locking device has been devised as follows: Secured to the rotatable bracket $A^4$, Figs. 1 and 7, is an upwardly extending bracket E, to which is pivotally connected a lever arm $E'$, Fig. 1. To the free end of the lever arm E′ is secured a rod E², the lower end of which passes through a suitable boss in the flange of the rotatable bracket A⁴, the lower end of the rod E², Fig. 7, being adapted to engage a suitable locking recess e in the flange of the fixed sleeve A³, the engagement of the rod E² with the locking recess e being facilitated by means of a spring e′, Fig. 7, seated in a socket e² and bearing upon the end of the lever E′, Figs. 1 and 7. From this construction it will be noted that the ramming devices may be swung about the column A by merely depressing the free end of the lever E′ and withdrawing the end of the rod E² from the locking recess e, and that, by reason of the spring e′, the ends of the rod will engage automatically another locking recess when it has arrived in a desired position.

It is manifestly important that the ramming devices should be incapable of performing their descending or ramming action at the time that such devices are not in position over the flask to be rammed and to secure this end I have provided a safety device comprising a bent arm F, Figs. 1 and 6, the end of such arm being secured to the locking rod E² by a suitable jointed connection, and such bent arm being journaled in suitable bearings F′ on the bracket D, Fig. 6, and carrying a second arm F² provided with a bent end or locking portion F³, Figs. 1 and 6. From this construction it will be noted that as the locking rod E² is raised to disengage its end from the locking notch e it will raise the end of the locking arm F connected thereto and will cause its hooked end F³, as a safety device, to insinuate itself in the line of movement of the valve stem operating handle D¹², so that such handle D¹² cannot be moved while the locking rod E² is disengaged from a locking notch in the fixed sleeve A³.

In the machine of my former patent, No. 775,530, the table and stripping mechanism provided that the pattern plate be raised in stripping the pattern from the mold, but in the present instance this is modified so that the pattern plate and its patterns remain stationary while a flask is lifted to strip the mold from the patterns. In order to increase the economical utility of the machine and facilitate the ramming of the sand in different flasks, I have provided, in the present instance, two table structures, diametrically disposed on opposite sides of the column A, so that, while the ramming devices are operating to compact the sand about the mold on one table, the flask and its contained mold may be manipulated and removed from the opposite table.

Secured to the column A are the twin brackets H disposed below the ramming devices and extending radially in opposite directions from the column. Secured to these twin brackets H are the main bracket arms H′ of the opposite tables, such permanent bracket arms H′ being substantially like those of my former patent and provided, see Fig. 8, with guide posts H² for a purpose that will presently appear.

Disposed beneath each of the tables is a cylinder H³ in which works a piston H⁴ connected to a yoke H⁵, the upper portions of said yoke being provided with extending perforated lugs H⁶, which embrace the guide posts H² of the main bracket H′, to thereby guide the yoke frame in its rising and falling movement, under the action of the pistons H⁴, as will presently appear. In order to lubricate posts H² in their movements they are provided with oil wells X having inlet ducts X′ and distributing ducts X².

Disposed upon and preferably secured to the top of the main brackets H′ is the pattern plate support K, which is in the form of a frame having a removed central portion. Supported upon the top of the pattern plate support is the flask frame or support J, Fig. 4, said flask frame or support preferably having a central opening portion somewhat more extensive than that of the pattern plate support K, whereby the pattern plate L, Fig. 8, may rest appropriately upon the inwardly projecting portions of the pattern plate support K, as will be clearly apparent from Fig. 8.

Secured to the perforated lugs H⁶ of the yoke frame H⁵ is the stripping plate M, which, therefore, has a rising and falling movement corresponding to that of the yoke H⁵. Secured to the stripping plate are the posts m m, preferably one at each corner of the stripping plate, which posts project upwardly and are secured by appropriate fastenings or screw devices m′ m′ to the flask frame or support J, such fastenings m′ being also shown in Fig. 9. From this construction it will be apparent that as the yoke frame H⁵ rises and falls under the action of its operating devices, the flask frame support J will also be carried positively upward and downward, and the pattern plate support K will remain, as will also the pattern plate L stationary upon the top of the table, or main bracket, H′. Obvious, should there be any vertical surfaces in the pattern called for, suitable stools may be secured to the stripping plate M to support the vertical sand walls as the flask is raised from the pattern.

Secured to the pattern plate support K, preferably one at each end, is a flask pin l, which projects upwardly and is of sufficient length to pass through the bushed opening l′ in the flask frame or support, J, and engage suitable openings in the flask itself. It will thus be seen that when the flask frame or support J starts to go up under the action of the yoke and its actuating means, it will strip the flask and bushed openings of the flask frame from the flask pins.

After the sand has been rammed, it becomes desirable to vibrate the pattern plate and detach the patterns from the sand and prevent sticking of the two before the stripping action takes place. In the present instance, I have provided a vibrator frame O, best shown in Fig. 9, and also shown in elevation in Figs. 1 and 2, and in section in Fig. 8. This vibrator frame consists preferably of three side structures, the ends of the arms $o'$ being secured to the main brackets H' by suitable connections $o^2$, in Figs. 1 and 9. The opposite ends of the arms $o'$ are connected by the cross-piece on which is mounted a vibrator $o^3$ of usual construction, such vibrator being adapted to operate upon the cushion piece $o^4$ to impart to the vibrator frame a tremulous motion. The vibrator frame O is connected by the blocks $o^5$ and screw bolts $o^6$ to the pattern plate L, as indicated in Fig. 8, so that, upon vibration being imparted to the vibrator frame, the pattern plate will be likewise vibrated. In order to give stability and avoid sagging of the vibrator frame due to the weight of the vibrator $o^3$, small blocks $o^7$ may be secured to the main bracket H', and project under the end portions of the vibrator frame, as indicated in Fig. 2.

Suitably disposed in connection with each of the tables is a three way valve P, Fig. 2, of any usual construction, to which compressed air or other fluid is supplied by means of a pipe $p$, Fig. 1, and each valve is operated by means of a suitable handle $p'$. Leading from the valve P is the pipe connection $p^2$, Figs. 1 and 2, connected with the vibrator $o^3$. Also connected with the valve P is the pipe $p^3$, Figs. 1 and 2, leading to an oil reservoir P', said oil reservoir having a pipe connection, $P^3$, with the lower end of the cylinder $H^3$, Fig. 8. The three way valve P has also an exhaust $p^5$ of any usual formation and, being well understood in structure, needs no amplification here. The three way valve P operates as usual so that, upon turning the handle $p'$ to a certain point, compressed air or other fluid may be supplied to the vibrator $o^3$ or, by turning the handle then to another position, the supply to the vibrator is cut off and compressed air or other fluid supplied to the oil reservoir P', which thereby forces the oil into the cylinder $H^3$, raising the yoke frame $H^5$ and with it the plate and flask frame, as hereinbefore indicated. By turning the handle $p'$ of the valve to a third position, the air or fluid pressure just supplied to the oil reservoir P' may be released.

In order that the movement of the yoke frame may be without shock in its upward movement, I have provided a cross-piece R, Fig. 8, to which is connected the screw-rod $r$, having a limiting stop $r'$, screw-threaded to the arm, a spring $r^2$ being interposed between the stop $r$ and the end of the yoke frame.

While I have described a detailed form and combination of devices as constituting the present embodiment of the invention, it is to be understood that this fact does not restrict the invention to these detailed structures, as variations may be made within the scope of the present invention.

Having thus described my invention, what I claim and desire to secure by Letters Patent is:

1. In a molding machine of the character described, the combination of a hollow supporting column, a fixed sleeve thereon, a bracket rotatably mounted on said sleeve, ramming devices supported upon said rotatable bracket, and means to limit its radius of rotation, said ramming devices comprising a plurality of cylinders and pistons, all said pistons acting simultaneously in the same direction and having one end connected to said ramming head and a main or throttle valve for controlling the admission and exhaust of a moter fluid to and from said column and cylinders.

2. In a molding machine, the combination of a hollow column or upright constituting a support and a reservoir for motor fluid, a sleeve fixedly mounted thereon, a bracket rotatably mounted on said fixed sleeve whereby it is adapted to swing about said column, ramming devices, comprising a main and auxiliary cylinders and pistons, mounted on said rotatable bracket, said pistons all acting in the same direction and each of said pistons being connected at one end to a single ramming head, means for directing and controlling the admission and exhaust of a motor fluid to and from the hollow upright column and said cylinders for actuating the ramming devices, a pair of oppositely disposed pattern-plate supports, means to support them from the upright column and means to limit the rotative movement of said rotatable bracket to bring the ramming devices into register with the pattern-plate supports alternately.

3. In a molding machine, the combination of a supporting column, ramming devices supported upon said column, said ramming devices comprising a main and auxiliary cylinders and pistons, a ramming head connected to said pistons, means for admitting a motor fluid above the respective pistons in said cylinders to cause them all to act during the ramming operation, and means for admitting a motor fluid below the pistons in the auxiliary cylinders to raise the ramming head after the ramming operation.

4. In a molding machine, the combination of a supporting column, ramming devices connected thereto, said ramming devices comprising a main and auxiliary cylinders and pistons, a ramming head connected to all of said pistons, a main or throttle valve for controlling the admission of a motor fluid above all of said pistons that they may all act simultaneously during the ramming operation, and for exhausting the fluid from above said pistons and admitting motor fluid below the auxiliary pistons to raise the ramming head after the ramming operation.

5. In a molding machine, the combination of a supporting column, ramming devices connected thereto and comprising a ramming head, a main ramming cylinder having an open lower end, a piston in said main cylinder and connected to the ramming head, auxiliary cylinders closed at their lower ends, pistons in said auxiliary cylinders, said pistons being also connected to the aforesaid ramming head, a single valve for admitting a motor fluid above all of said pistons to cause them to act in unison during the ramming operation, and means for admitting motor fluid below the pistons in the auxiliary cylinders to raise the ramming head after the ramming operation.

6. In a molding machine, the combination of a supporting column, ramming devices supported by and adapted to swing about said column, a lock for holding the ramming devices from swinging about the column during the ramming operation, and a safety device, operatively connected to the lock for preventing the operation of the ramming devices as they are being swung about said column.

7. In a molding machine, the combination of a supporting column, ramming devices adapted to swing about said column, a valve for controlling the operation of the ramming devices, means for operating the valve, a lock for holding the ramming devices from swinging during the ramming operation, and a safety device connected to said lock for maintaining the said means in inoperative position as the ramming devices are swung about the column.

8. In a molding machine, the combination of a supporting column, twin brackets projecting in opposite directions therefrom, a pattern plate support mounted upon each of said brackets, a movable flask frame superposed upon the pattern plate support, a stripping plate, a movable yoke carrying said stripping plate, posts or rods depending from the aforesaid flask frame and adapted to be engaged by the stripping plate to thereby raise the flask frame as the stripping plate is raised, means for raising and lowering said yoke and means for guiding said flask support in its movements.

9. In a molding machine, the combination of a column or support, a bracket mounted on said support, a stationary pattern-plate support mounted on said bracket, a flask support superposed upon said pattern-plate support, guide pins on said pattern-plate support, openings in said flask support for receiving said guide pins to thereby guide said flask-support in its upward movement, rods depending from the aforesaid flask-support, and a stripping plate, said stripping plate being adapted to engage said rods and through them raise the flask to withdraw the same from the molds.

10. In a molding machine, the combination of a supporting column, twin brackets projecting in opposite directions therefrom, a pattern plate support mounted upon each of said brackets, a flask frame superposed upon the pattern plate support, a stripping plate, a movable yoke carrying the stripping plate, posts connecting the flask frame and stripping plate, means for raising and lowering the yoke, and a single ramming device with means to bring it into register with either of said flask frames, said means consisting of a supporting bracket rotatably mounted intermediate the length of said column.

11. In a molding machine, the combination of a supporting column, twin brackets projecting in opposite directions therefrom, a pattern plate support mounted upon each of said brackets, a flask frame superposed upon the pattern plate support, a stripping plate, a movable yoke carrying the stripping plate, posts connecting the flask frame and stripping plate, means for raising and lowering the yoke, a single ramming device with means to bring it into register with either of said flask frames, said means consisting of a supporting bracket rotatably mounted intermediate the length of said column, and means for locking said ramming device in its adjusted position.

12. In a molding machine, the combination of a supporting column, a bracket mounted on said column, a stationary pattern-plate support mounted on said bracket, a flask support mounted on said pattern-plate support, a movable stripping plate, suitable connections between said flask support and said stripping plate, whereby the former is moved by means of the latter to raise said flask-support to thereby withdraw the flask from the molds.

13. In a molding machine, the combination of a supporting column, ramming devices adjustably and rotatably mounted thereon, twin brackets projecting in opposite directions from said column, a pattern plate support mounted on said brackets, flask pins secured to and projecting upward from the pattern plate support, a flask frame superposed upon the pattern plate support and having openings through which the flask pins project, said openings being provided with bushings, and means for raising the flask frame to strip the pins from the flask and said frame.

14. In a molding machine, the combination of a supporting column, ramming devices supported by and adapted to swing about said column, a lock for holding the ramming devices from swinging about the column during the ramming operation of the ramming devices as they are being swung about said column, twin brackets attached to said column, a stationary pattern plate support mounted upon each of said brackets, a flask frame superposed upon the pattern plate support, a stripping plate and a movable yoke carrying said stripping plate and connections between said stripping plate and flask frame for operating or raising the former by means of the latter.

15. In a molding machine, a supporting column, a bracket adapted to swing about said column, ramming devices supported by said column, a lock for holding the ramming devices from swinging about the column during the ramming operation, a safety device for preventing the operation of the ramming devices as they are being swung about said column, means for automatically operating said safety device upon the movement of the aforesaid lock, and an adjusting screw by which said ramming devices may be raised and lowered and securely held in such raised or lowered position.

In testimony whereof, I have hereunto affixed my signature this fifth day of April A. D. 1906.

FREDERICK W. HALL.

Witnesses:
HENRY T. RULLMANN,
A. M. BIDDLE.